United States Patent [19]
Menicagli et al.

[11] Patent Number: 5,266,540
[45] Date of Patent: Nov. 30, 1993

[54] PROCESS FOR THE REGENERATION OF ACTIVE CARBON

[75] Inventors: Roberto Menicagli, Mediglia; Fausto Miano, Enna; Enrico Borgarello, Turin, all of Italy

[73] Assignee: Eniricerche S.p.A., Milan, Italy

[21] Appl. No.: 34,187

[22] Filed: Mar. 22, 1993

Related U.S. Application Data

[63] Continuation of Ser. No. 649,579, Feb. 1, 1991, abandoned.

[30] Foreign Application Priority Data

Feb. 1, 1991 [IT] Italy ................ 19241 A/90

[51] Int. Cl.$^5$ .............. B01J 20/34; B01J 37/34; B01D 15/04
[52] U.S. Cl. ....................... 502/5; 210/694; 502/22
[58] Field of Search ............... 502/5, 23, 22; 204/158.21

[56] References Cited

U.S. PATENT DOCUMENTS

| | | | |
|---|---|---|---|
| 3,150,105 | 9/1964 | Ledding | 502/23 |
| 3,386,922 | 6/1968 | Rothschild et al. | 502/23 |
| 3,912,625 | 10/1975 | Case et al. | 210/30 |
| 4,571,290 | 2/1986 | Ward et al. | 204/157.69 |
| 4,863,608 | 9/1989 | Kawai et al. | 210/638 |
| 4,954,465 | 9/1990 | Kawashima et al. | 502/5 |

FOREIGN PATENT DOCUMENTS

| | | |
|---|---|---|
| 0325133 | 7/1989 | European Pat. Off. |
| 61-200837 | 5/1986 | Japan |
| 2021548 | 12/1979 | United Kingdom |

Primary Examiner—Paul E. Konopka
Attorney, Agent, or Firm—Shea & Gould

[57] ABSTRACT

The regeneration of active carbon onto which one or more organic substances may be adsorbed is achieved by means of a photodegrading process catalyzed by a semiconductor.

19 Claims, No Drawings

PROCESS FOR THE REGENERATION OF ACTIVE CARBON

This application is a continuation of patent application Ser. No. 03/649,579 filed Feb. 1, 1991, now abandoned.

A method is described for the purification of active carbon onto which one or more organic substances may be adsorbed. This method consists in subjecting such carbon, in an aqueous suspension, to light radiation of a wave length shorter than 500 nm, in the presence of a semiconductor as a catalyst.

Active carbon is used as a decolourant and purifier in, for example, the organic acids, glycerine, glucose, sugar, wine and vegetable oil industries. In many cases, in addition to the adsorption of colouring substances, other useful effects are achieved such as the adsorption of suspended colloids, deodorization and disinfection. One particular use of active carbon is in the purification of water polluted by organic material deriving from industrial waste, urban waste, chemical treatments for agriculture, etc. From this polluted water, drinking water may be obtained by filtration through active carbon.

After use, the active carbon is regenerated. There are various regeneration methods such as thermal regeneration, steam stripping or washing with acid or alkaline solutions or with organic solvent, depending on the nature of the polluting organic substances adsorbed.

The use of the first method is limited by various problems: on the one hand the high cost of combustion, on the other the release of toxic substances deriving from the partial oxidation of the pollutants, in the form of particles or condensates. As regards the other regeneration methods, they essentially consist in transferring the pollutants from the carbon to an aqueous or organic solution. These solutions in turn obviously require further purification treatment which, in the case of water, enables the latter to be discharged and in the case of organic solvent, enables the latter to be recovered and reused.

We have now discovered a method which makes it possible to regenerate active carbon onto which one or more organic substances may be adsorbed by means of a process which, in a single stage, results in the complete degradation of the organic pollutants.

This method consists in subjecting the said carbon, in aqueous suspension, to light radiation of a wave length shorter than 500 nm, in the presence of a semiconductor as a catalyst.

The purification of polluted water by means of photocatalytic processes is already known (D. Ollis, Environ. Sci. Technol., Vol. 19, Nov. 6, 1985). Such purification is achieved by subjecting the polluted water to a photodegrading process in the presence of a semiconductor as a catalyst. In these conditions the semiconductor absorbs radiation with the consequent promotion of an electron to the conduction band and the formation of an electron void in the valence band. Both these types of reactants may migrate to the surface of the catalyst where they are capable of causing redox reactions in the polluting substances as they are adsorbed thereon. In particular, these substances may be converted into other less toxic substances or be completely mineralized, i.e. converted into carbon dioxide and water.

We have now surprisingly discovered that it is possible to regenerate by means of a photocatalytic process an active carbon onto which polluting organic substances are adsorbed. The object of the present invention is therefore a method for the regeneration of active carbon which consists in irradiating such carbon, in aqueous suspension, with radiation of a wave length shorter than 500 nm, in the presence of a semiconductor as a catalyst.

The prior art makes no mention of the fact that it is possible to degrade polluting substances adsorbed onto active carbon by means of heterogeneous photocatalysis, indeed such behaviour is totally unexpected. The distribution constants of most pollutants are in fact such as to make their concentration in the reaction water very low, and one could therefore have expected reaction speeds too slow to be exploited industrially. Furthermore the carbon absorbs part of the light radiation limiting the penetration of the latter into the reaction mixture.

The process covered by our invention is performed by placing the active carbon to be regenerated in an aqueous suspension in a reactor and then subjecting it to irradiation by a lamp which emits radiation of a wave length shorter than 500 nm, in the presence of a semiconductor as a catalyst.

The semiconductors that can be used as catalysts in this process are titanium dioxide, zinc oxide and iron oxide.

These catalysts are dispersed in water and may be in the form of colloids, powder, microspheres, or appropriately supported.

In the first case the semiconductors may be for example in particles of a particle size of between 0.01 and 1 $\mu$m and the second case in particles of a particle size of between 1 and 100 $\mu$m.

The microspheres may for example have a diameter of between 0.1 and 5.0 mm and be prepared as described in U.K. Patent No. 2.112.764.

In the case of supported catalysts, the support used may for example be glass.

Catalysts dispersed in water in colloidal and powder form are used in a concentration of between 0.1 and 10 g/l. Catalysts in the form of microspheres or supported are used in a concentration of between 10 and 100 g/l.

The lamps that may be used are those that emit radiation of a wave length shorter than 500 nm, preferably between 240 and 450 nm. Such lamps may be high- or low-pressure xenon or mercury vapour lamps.

During the process air or oxygen may be blown into the reactor.

The process may be performed both continuously and discontinuously.

The reactors that may be used in the present invention are those already described for photocatalytic processes in aqueous solution: they may for example be of the "immersion" type, i.e. in which in a conventional chemical reactor, a lamp is immersed through the lid into the reaction mixture or, for example, the annular type, i.e. comprising two coaxial cylinders which delimit the reaction area with the lamp being placed on the axis of symmetry. One type of reactor that may be used is for example that described in U.S. Ser. No. 521,357.

When the process is completed the carbon is recovered from tile reaction mixture and the remaining aqueous suspension of catalyst is again supplied to the reactor. The carbon may be recovered, for example, by gravimetric separation or by flotation.

By using the process covered by the present invention active carbon of different natures and compositions may be purified: it is thus possible to regenerate active carbons of both animal and vegetable origin. The quantity of carbon that may be present in the reaction environment is between 0.1 and 20 g/l, preferably between 1 and 10 g/l.

Organic pollutants, depending on their nature, may be converted into less toxic compounds or be completely mineralized.

The following examples have the sole aim of better illustrating the process covered by the present invention and in no case should be interpreted as a limitation of its aims.

EXAMPLE 1

A sample of spent active carbon is prepared by treating 400 mg of active carbon and 200 mg of $TiO_2$ with four 50 ml-portions of an aqueous solution of phenol having a concentration of 2000 mg/l.

With the first treatment the carbon sample absorbs 39.5 mg of phenol, with the second treatment 38 mg and with the third 16, whereas on the fourth treatment, since only 4 mg are absorbed, the sample is regarded as saturated. In total 97 mg of phenol have been absorbed, corresponding to 242 mg of phenol per gram of active carbon.

The mixture of spent active carbon and $TiO_2$ thus prepared is suspended in 200 ml of water.

In the suspension, kept under agitation, a 40 W mercury-vapour low-pressure lamp is immersed and then irradiation continues for 18 hours.

On completion the suspension is filtered so as to separate the carbon and catalyst from the water. In the water 21.6 mg of non-degraded phenol is found. The carbon is then again treated with four 50 ml-portions of an aqueous solution of phenol having a concentration of 2000 mg/l, in order to assess the extent of its regeneration.

On completion of this treatment the carbon sample has absorbed 64 mg of phenol. Thus in total (64−21.6) mg=42.4 mg of phenol have been degraded photocatalytically, corresponding to a 44% regeneration.

EXAMPLE 2

Example 1 is repeated under the same conditions, but in the absence of $TiO_2$. On completion of the photodegrading treatment the sample of active carbon is recovered by filtration and treated with 50 ml of an aqueous solution containing 2000 mg/l of phenol. From this solution the carbon sample is capable of absorbing only 0.015 mg of phenol thus proving that, in the absence of a semiconductor as a catalyst, active carbon is not regenerated.

EXAMPLE 3

500 mg of active carbon are mixed with 100 mg of $TiO_2$ and then treated with 100 ml of a solution containing 500 mg/l of p-chlorophenol, for 30' under agitation. The treatment is repeated twice more with two fresh solutions the same as the previous one. On completion of the three treatments, the sample of active carbon has absorbed 66 mg of p-chlorophenol. The spent carbon thus obtained is suspended in 120 ml of water and subjected for 6 hours to irradiation by means of a 40 W low-pressure mercury-vapour lamp. The carbon is then prepared by filtration. The aqueous floating substance contains 7 mg of p-chlorophenol. The carbon sample regenerated by photodegradation is subjected to further treatment with two 100 ml-portions of an aqueous solution containing 500 mg/l of p-chlorophenol. On completion of the treatment the carbon sample has absorbed 17 mg of p-chlorophenol. In total therefore the photocatalytic treatment has enabled 10 mg of p-chlorophenol to be degraded, corresponding to a regeneration for the sample of active carbon of 15%.

EXAMPLE 4

400 mg of active carbon are mixed with 200 mg of $TiO_2$ and then treated with 100 ml of a solution containing 500 mg/l of p-chlorophenol, for 30' under agitation. The treatment is repeated twice more with two fresh solutions the same as the previous one. On completion of the three treatments, the sample of active carbon has absorbed 48.6 mg of p-chlorophenol. The spent carbon thus obtained is suspended in 200 ml of water and subjected for 18 hours to irradiation by means of a 40 W low-pressure mercury-vapour lamp. The carbon is then separated by filtration. The aqueous floating substance contains 7.6 mg of p-chlorophenol. The carbon sample regenerated by photodegradation is subjected to further treatment with two 100 ml-portions of an aqueous solution containing 500 mg/l of p-chlorophenol. On completion of the treatment the carbon sample has absorbed 41 mg of p-chlorophenol. In total therefore the photocatalytic treatment has enabled (41.0−7.6)=33.4 mg of p-chlorophenol to be degraded, corresponding to a regeneration for the sample of active carbon of 69%.

We claim:

1. A method for regenerating spent active animal or vegetable charcoal onto which polluting organic substances are adsorbed, comprising the steps of:
   (a) preparing an aqueous slurry comprised of (i) the spent charcoal and (ii), as a catalyst, a semiconductor selected from the group consisting of titanium dioxide, zinc oxide, and iron oxide in an amount sufficient to effect at least partial regeneration of the spent charcoal;
   (b) continuously agitating the aqueous slurry;
   (c) subjecting the agitated aqueous slurry to light radiation of a wave length shorter than 500 nm generated by a light source immersed in the slurry for a time sufficient to effect at least partial regeneration of the spent charcoal; and
   (d) separating the solids from the slurry to recover an at least partially regenerated active charcoal.

2. A method according to claim 1 in which the semiconductor is dispersed in water in a colloidal or powder form.

3. A method according to claim 2 in which the semiconductor is used in a concentration of between 0.1 and 10 g/l 4. A method according to claim 2 in which the semiconductor is in a colloidal form in particles of particle size of between 0.01 and 1 μm.

5. A method according to claim 2 in which the semiconductor is in the form of a powder in particles of a particle size greater than 1 μm and less than 100 μm.

6. A method according to claim 1 in which the semiconductor is dispersed in water in the form of microspheres or supported.

7. A method according to claim 6 in which the semiconductor is in the form of microspheres of a diameter of between 0.1 and 5.0 mm.

8. A method according to claim 6 in which the semiconductor is supported on glass.

9. A method for regenerating spent active animal or vegetable charcoal onto which polluting organic substances are adsorbed, comprising the steps of:
  (a) preparing an aqueous slurry comprised of (i) from about 0.1 to about 20.0 grams per liter of spent charcoal, and (ii) from about 0.1 to about 100.0 grams per liter of a semiconductor selected from the group consisting of titanium dioxide, zinc oxide, and iron oxide as a catalyst;
  (b) continuously agitating the aqueous slurry;
  (c) subjecting the agitated aqueous slurry to light radiation of a wave length shorter than 500 nm generated by a light source immersed in the aqueous slurry for at least about 18 hours; and
  (d) separating the solids from the aqueous slurry to recover an at least regenerated active charcoal.

10. A method according to claim 9 in which the radiation is of a wave length of between 450 and 240 nm.

11. A method according to claim 10 in which the radiation is emitted by a high- or low-pressure xenon- or mercury-vapour arc lamp.

12. A method according to claim 10 in which the radiation is emitted by a high- or low-pressure xenon- or mercury-vapour arc lamp.

13. A method according to claim 9 in which the semiconductor is titanium dioxide.

14. A method according to claim 9, in which the semiconductor is titanium dioxide.

15. A method according to claim 9 in which the concentration of active carbon is between 0.1 and 20 g/l.

16. A method according to claim 9 in which the concentration of active carbon is between 1 and 10 g/l.

17. A method according to claim 9 in which the radiation is of a wave length of between 380 and 240 nm and the semiconductor is titanium dioxide.

18. A method according to claim 9 in which during the treatment air or oxygen is blown into the aqueous suspension.

19. A method according to claim 9 performed continuously in an annular reactor.

* * * * *